(No Model.)
R. M. HUNTER.
ELECTRIC UNDERGROUND CONDUCTOR.
No. 272,441. Patented Feb. 20, 1883.
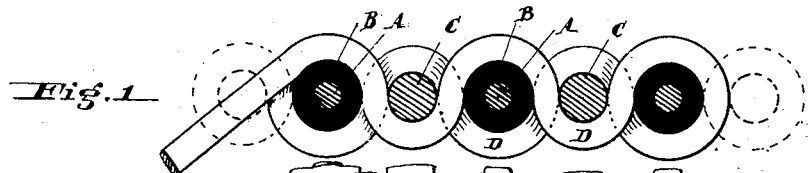
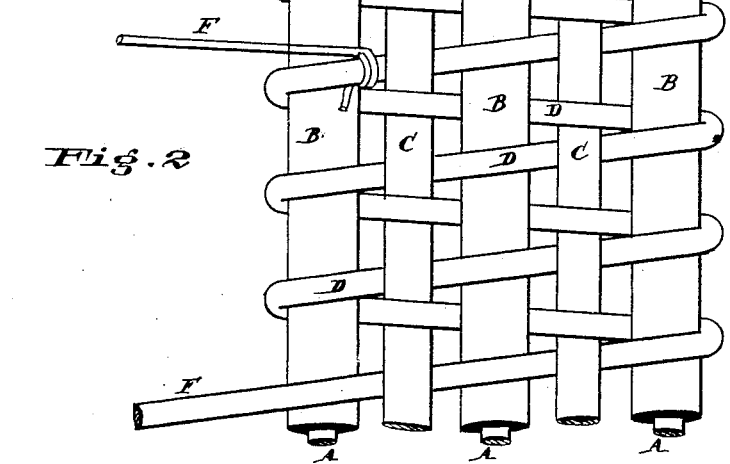
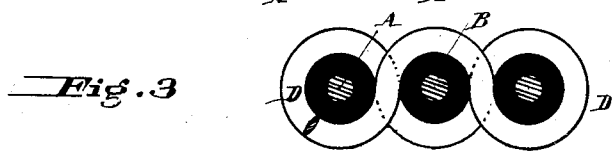
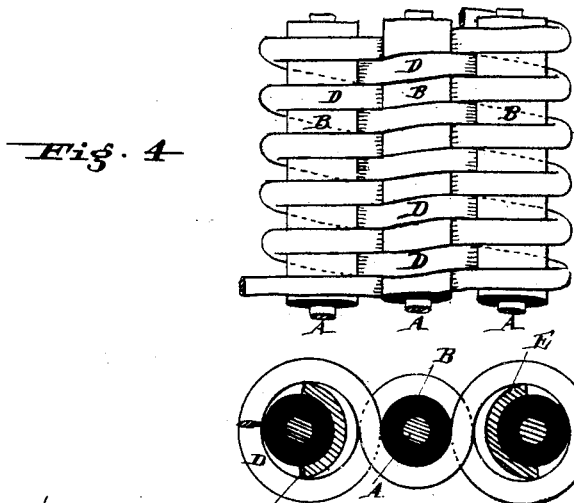
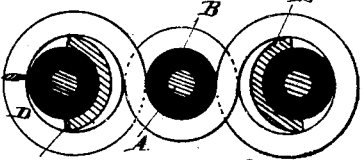
Attest
Davis
W. McWade
Inventor
Rudolph M. Hunter

UNITED STATES PATENT OFFICE.

RUDOLPH M. HUNTER, OF PHILADELPHIA, PENNSYLVANIA.

ELECTRIC UNDERGROUND CONDUCTOR.

SPECIFICATION forming part of Letters Patent No. 272,441, dated February 20, 1883.

Application filed December 12, 1882. (No model.)

*To all whom it may concern:*

Be it known that I, RUDOLPH M. HUNTER, of the city and county of Philadelphia, and State of Pennsylvania, have invented an Improvement in Electric Underground Conductors, of which the following is a specification.

My invention has reference to underground electric conductors or cables; and it consists in weaving together two or more electric wires with metal filling, the warp being the electric wires and the metal filling being electrically connected with the earth, and in details of construction, all of which is more fully set forth in the following specification and shown in the accompanying drawings, which form part thereof.

The object of my invention is to so form an electric cable that all or nearly all of the injurious effects produced by induction shall be overcome, and thereby enable two or more telegraph, telephone, or electric-light wires to be laid side by side in an underground conduit.

In the drawings, Figure 1 is a cross-section of my improved anti-induction cable. Fig. 2 is a plan view of same. Figs. 3 and 4 are respectively similar views of a modification of same, and Fig. 5 is a sectional view of another modification of same.

A are the line-wires, and B are their insulations.

C are longitudinal wires arranged alternately with insulated line-wires A.

D is the filling, and is made of uncovered wire, preferably copper.

F are ground-wires, which may be used to connect the filling-wires D or wires C with the earth at intervals.

Upon a current of electricity over the wires A being interrupted, or having its intensity changed, an induced current is set up in the filling-wires D and longitudinal wires C, but quickly passes to earth, thus protecting the other wires, A, from the deleterious effects.

If desired, the longitudinal wires C may be dispensed with, as shown in Fig. 3, and in this construction the best effect is produced when the filling-wires touch each other in crossing, as shown in Fig. 3.

In place of using the longitudinal wires C segmental copper strips E may be used between the filling D and wires A, on the sides adjacent to the other electric wires A, as shown in Fig. 5. It is self-evident that the insulation may be on the filling and the wires A remain plain.

I do not limit myself to any particular method of weaving the filling onto the line-wires, as it may be accomplished in numerous ways.

Two or more line-wires may be woven into the cable, and a series of these cables may be placed in the same conduit without fear of injurious effects from induction.

Having now described my invention, what I claim as new, and desire to secure by Letters Patent, is—

1. An anti-induction cable for telegraphic, telephonic, or electric-light wires, which consists of two or more longitudinal wires interwoven with cross-wires, the said interwoven wires binding the said line-wires into a compact and strong cable, substantially as and for the purpose specified.

2. In an electric cable, two or more line-wires having insulated coatings, in combination with wires interwoven therewith and arranged across said line-wires, the said interwoven wires binding the said line-wires into a compact and strong cable, substantially as and for the purpose specified.

3. An electric cable which consists of two or more insulated line-wires arranged alternately with longitudinal uninsulated wires, in combination with interwoven wire-work, the whole being woven into a single piece, substantially as and for the purpose set forth.

4. An electric cable which consists of two or more electric or line wires insulated from their surroundings, in combination with longitudinal metal conductors arranged between said line-wires, and filling-wires interwoven about said line-wires, substantially as and for the purpose specified.

5. Two or more line-wires, in combination with interwoven wire-work and insulations, the said line-wires having a continuous line of metal interposed between them and their insulations, substantially as and for the purpose specified.

In testimony of which invention I hereunto set my hand.

RUDOLPH M. HUNTER.

Witnesses:
R. S. CHILD, Jr.,
R. A. CAVIN.